United States Patent [19]
Belenkiy et al.

[11] Patent Number: 5,347,603
[45] Date of Patent: Sep. 13, 1994

[54] RIGHT ANGLE CABLE STRAIN RELIEF

[75] Inventors: Yuriy Belenkiy, Chicago, Ill.; Dennis Cheatham, Garland, Tex.; Xavier Clairadin, Naperville, Ill.; Igor Grois, Northbrook, Ill.; Mark Margolin, Lincolnwood, Ill.

[73] Assignee: Molex Incorporated, Lisle, Ill.

[21] Appl. No.: 77,174

[22] Filed: Jun. 14, 1993

[51] Int. Cl.$^5$ .............................................. G02B 6/44
[52] U.S. Cl. ........................................ 385/86; 385/76; 385/87
[58] Field of Search .................... 385/70, 76, 83, 84, 385/86, 87, 100

[56] References Cited

U.S. PATENT DOCUMENTS

| | | | |
|---|---|---|---|
| 4,652,082 | 3/1987 | Warner | 350/96.20 |
| 5,073,044 | 12/1991 | Egner et al. | 385/86 |
| 5,094,552 | 3/1992 | Monroe et al. | 385/76 |
| 5,138,678 | 8/1992 | Briggs et al. | 385/86 |
| 5,202,942 | 4/1993 | Collins et al. | 385/86 X |
| 5,239,604 | 8/1993 | Ziebol et al. | 385/84 |

Primary Examiner—John D. Lee
Assistant Examiner—Phan Thi Heartney
Attorney, Agent, or Firm—A. A. Tirva

[57] ABSTRACT

A right angle strain relief system is provided for an optical fiber cable. A fiber optic connector terminates a fiber of the cable on a longitudinal connector axis. A right angle strain relief boot extends from a rear of the connector and has a cable-receiving passage therethrough. The boot has a first leg portion and a second leg portion joined by a bend. The first leg portion is on the longitudinal connector axis and defines a proximal end of the boot coupled to the rear of the connector. The second leg portion extends transversely of the longitudinal connector axis and defines an open distal end of the boot from which the optical fiber cable extends. The boot is rotatable relative to the connector about the longitudinal connector axis. A slot is provided in the boot extending from the open distal end thereof generally to at least the bend in the boot. The slot is of a width to allow the optical fiber cable to be moved outwardly of the second leg portion to a position projecting from the first leg portion generally on the longitudinal connector axis. The boot can be rotated to various angular orientations relative to the connector, while the cable is in the axial position, without twisting the cable.

12 Claims, 2 Drawing Sheets

RIGHT ANGLE CABLE STRAIN RELIEF

FIELD OF THE INVENTION

This invention generally relates to the art of cable connectors and, particularly, to a right angle cable strain relief for connectors such as optical fiber connectors.

BACKGROUND OF THE INVENTION

Connectors are used for joining light-transmitting optical fiber cables to transmitter devices, receiver devices or to other cables. Optical fiber cables are somewhat delicate in that they can be bent or kinked and damage or destroy the interior buffered fiber of the cable. Therefore, as an optical fiber cable projects away from a connection, it is important that the fiber project in a manner that will not overstress or kink the fiber. Overstressing or kinking can interfere with the signal transmitting capabilities of the fiber.

Of course, the best condition for an optical fiber cable is to project straight away from its connection. However, it is not always possible to extend the cable in a straight line, particularly when the cable is used in compact environments. For example, connections are made to transceiver devices located at the rear of a computer and toward a rear wall. This requires routing or dressing the cable at an angle away from its connection, sometimes a severe angle to the plane of the connection.

In view of the problems identified above and to satisfy various packaging requirements, fiber optic connectors often are provided with right angle boots projecting from the rear of the connectors to maintain the terminated optical fiber cables in smooth angles projecting from the connectors. The boots prevent overstressing or kinking of the buffered fiber and provide an improved strain relief for the cables as the cables are maintained in minimum bend radius parameters.

However, one of the problems with right-angled, booted connectors is that a boot often projects from a connector at a given or fixed angle, whereas it may be necessary to dress the cable away from the connector at a different angle. Providing an inventory of connectors with boots at various different angles could be an unduly expensive expedient. Consequently, connectors have been provided with right angle boots which rotate about the longitudinal connector axes to different angles and thereby accommodate different packaging/dressing requirements. A problem with such rotatable boots is that, if a cable is terminated to the connector and extends through the boot, rotation of the boot can twist the cable and damage the buffered fiber therewithin.

This invention is directed to solving the myriad of problems presented above by providing a connector with an unique boot which allows the cable to be moved from a right angle position within the boot to an axial position partially removed from the boot so that the boot can be rotated to different angled orientations without twisting the cable, and the cable thereafter can be repositioned at an angle within the boot, all of these adjustments being made without removing the boot from the connector.

SUMMARY OF THE INVENTION

An object, therefore, of the invention is to provide a new and improved right angle cable strain relief means of the character described.

The invention is exemplified herein as embodied in a right angle strain relief system for an optical fiber cable. A fiber optic connector is provided for terminating a fiber of the cable on a longitudinal connector axis. A right angle strain relief boot extends from a rear of the connector. The boot has a cable-receiving passage therethrough and includes a first leg portion and a second leg portion joined at a bend. The first leg portion is on the longitudinal connector axis and defines a proximal end of the boot coupled to the rear of the connector. The second leg portion extends transversely of the longitudinal connector axis and defines an open distal end of the boot from which the optical fiber cable extends.

The invention contemplates the provision of slot means in the boot which extends from the open distal end thereof generally to at least the bend in the boot. The slot means is of a width to allow the optical fiber cable to be moved outwardly of the second leg portion to a position projecting from the first leg portion generally on the longitudinal connector axis. Complementary interengaging coupling means are provided between the proximal end of the boot and the connector to provide for rotation of the boot about the longitudinal connector axis. Therefore, the cable can be moved out of the second leg portion of the boot, through the slot means, and the boot can be rotated to various angular orientations relative to the connector without twisting the cable.

As disclosed herein, the width of the slot means is approximately the same as the diameter of the cable. However, the slot means include a mouth near the distal end of the boot which is narrower than the diameter of the cable. The boot is fabricated of flexible material and the mouth provides a snap-fitting restriction post which the cable moves into and out of the cable-receiving passage. The slot means is located in a rearwardly facing side of the boot and extends from the open distal end of the boot substantially through the bend in the boot.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 3 is a rear elevational view of the assembly, as looking toward the right-hand side of FIG. 2.

DETAILED DESCRIPTION OF THE PREFERRED EMBODIMENT

Figure 1:
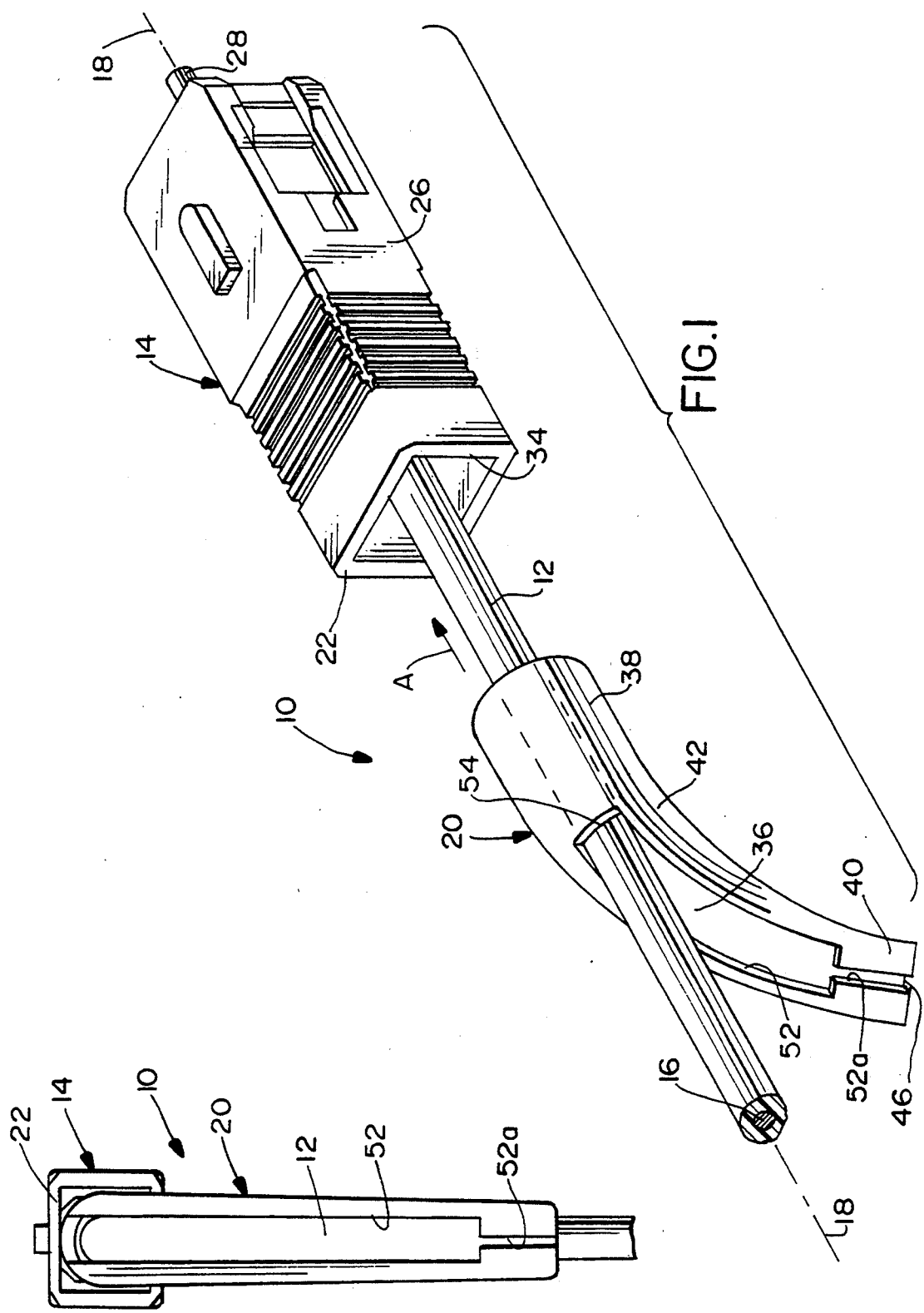
FIG. 1 is a rear perspective view of a fiber optic connector terminating an optical fiber cable, with the right angle strain relief boot separated from the connector to facilitate the illustration.

Referring to the drawings in greater detail, the invention is embodied in a right angle strain relief system, generally designated 10 (FIG. 2), for an optical fiber cable 12. The system includes a fiber optic connector, generally designated 14, for terminating a fiber 16 of the cable on a longitudinal axis 18 of the connector. A right angle strain relief boot, generally designated 20, extends from a rear 22 of connector 14.

At this point, it should be understood that the use of the phrase "right angle" herein is not to be considered limiting. In other words, the use of that phrase is not intended to be restrictive to a precise 90° angle of the boot or the system. Although substantially full 90° right angle boots are conventional in the industry, it is understood that the concepts of the invention are equally applicable to boots that might be in configurations at angles more or less than a precise 90° to properly dress cables as they extend away from various connectors.

Figure 2:
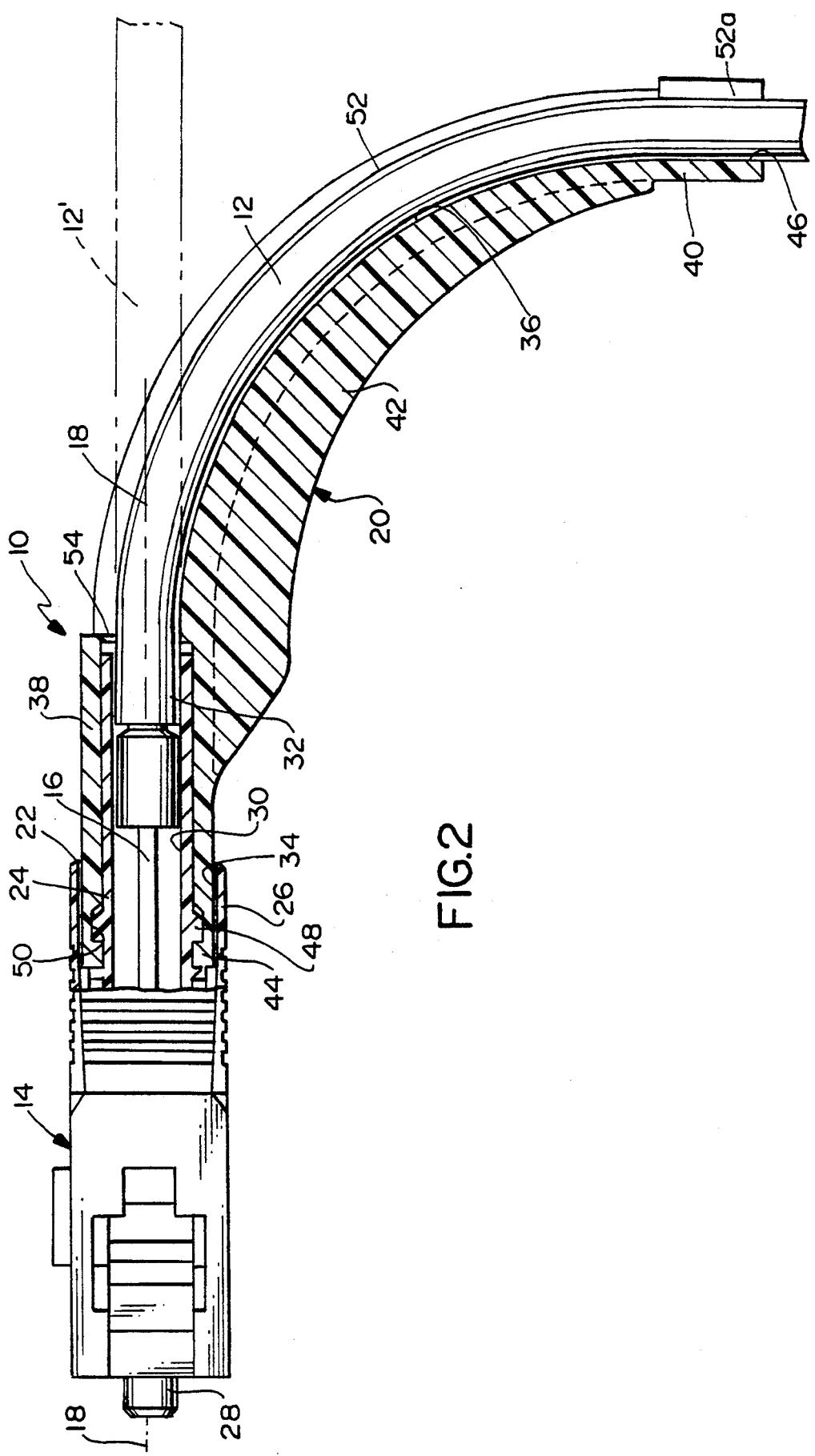
FIG. 2 is a side elevational view of the connector, with a fragmented section through the rear of the cable and the strain relief boot.

As best seen in FIG. 2, but somewhat in FIG. 1, fiber optic connector 14 includes an inner body 24 and an outer housing 26, with a forwardly projecting ferrule 28 within which the end of fiber 16 is terminated. Inner body 24 includes a central passage 30 on connector axis 18 for receiving a distal end 32 of cable 12. Outer housing 26 has an inner rectangular cavity 34 which opens at the rear 22 of the connector and into which boot 20 is inserted.

Right angle strain relief boot 20 has a cable-receiving passage 36 therethrough and includes a first leg portion 38 and a second leg portion 40 joined at a bend 42. The boot is fabricated of flexible material, such as a plastic or semi-rigid polymer. First leg portion 38 is coupled to connector 14 so that the first leg portion is on longitudinal connector axis 18 and defines a proximal end 44 of the boot. Second leg portion 40 extends transversely or at a right angle to longitudinal connector axis 18 and defines an open distal end 46 of the boot from which optical fiber cable 12 extends, as seen in FIG. 2, when the cable is in its normal strain relieved position within passage 36 of the boot.

Generally, complementary interengaging coupling means are provided between proximal end 44 of boot 20 and connector 14 to provide for rotation of the boot about longitudinal connector axis 18. More particularly, referring specifically to FIG. 2, inner body 24 of connector 14 includes an outwardly projecting circumferential flange 48, and proximal end 44 of boot 20 includes an inwardly opening circular groove 50. It can be seen that the rear edge of flange 48 is angled or chamfered. Therefore, the boot is assembled to the connector by pushing the boot in the direction of arrow "A" (FIG. 1), whereby proximal end 44 of the boot will enter cavity 34 of outer housing 26 and into engagement with chamfered flange 48. Since the boot is flexible, the boot will snap over the flange until the flange seats into groove 50 within the proximal end of the boot. It can be seen that the front edge of flange 48 is generally abrupt for abutting a front shoulder of groove 50 to prevent unintentional pulling of the boot out of the connector, whereby the boot performs its strain relief function for cable 12 once assembled to the connector as shown in FIG. 2.

Generally, the invention contemplates means whereby optical fiber cable 12 can be moved from its contained position within boot 20 as shown in FIG. 2, to a position extending axially from connector 14 as shown in FIG. 1, to allow boot 20 to be rotated about longitudinal connector axis 18 to various angular orientations relative to connector 14, without twisting the optical fiber cable. More particularly, a slot 52 is formed in the boot and extends from the open distal end 46 thereof, generally to and preferably through bend 42 in the boot, to a closed end 54 of the slot. The slot narrows near the open end 46 of the boot to define a mouth or restriction 52a. In the preferred embodiment of the invention, the width of mouth 52a is narrower than the diameter of cable 12, and the width of the remainder of slot 52 is approximately the same as the diameter of the cable. Therefore, the cable can snap into and out of passage 36 past mouth 52a, but freely move within slot 52. In essence, the circumference of boot 20 in the area of mouth 52a retains the cable within passage 36 to provide a controlled bending of the cable as best seen in FIG. 2, while the boot still provides strain relief for the cable.

In an actual example, cable 12, passage 36 and the width of slot 52 all may be on the order of 0.118 inch. Mouth 52a may have a width on the order of 0.020 inch.

In operation or use, cable 12 is terminated to connector 14, and right angle boot 20 is coupled to the connector as shown in FIG. 2. The cable is encapsulated by the boot to provide a controlled bending for the cable and avoid twisting or kinking of the cable. This would be a normal condition for use of the assembly or system shown. However, should it be desirable for the cable to extend from the connector at a different angle from that shown in FIG. 2, cable 12 is moved out of second leg portion 40 of the boot, past mouth 52a of slot 50, to a position projecting from the connector and first leg portion 44 of the boot on longitudinal axis 18 of the connector. This is shown by the position of the cable in FIG. 1, and the phantom position of the cable shown at 12' in FIG. 2. With the cable in this straight line position extending away from connector 14, boot 20 can be rotated about axis 18 without uncoupling the boot from the connector and without removing the cable from the connector. Once the boot is in a new desired angular orientation, cable 12 can be snapped back past mouth 52a and into passage 36 of the boot. It can be seen that such an adjusting procedure of the relative angular orientation between boot 20 and connector 14 can be performed without twisting cable 12, because the cable has been moved to a straight line position on longitudinal connector axis 18 which is the rotational axis of the boot.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. In a right angle strain relief system for an optical fiber cable, including a fiber optic connector for terminating a fiber of the cable on a longitudinal connector axis, and a right angle strain relief boot extending from a rear of the connector, the boot having a cable-receiving passage therethrough, the boot having a first leg portion and a second leg portion joined at a bend, the first leg portion being on said longitudinal connector axis and defining a proximal end of the boot coupled to said rear of the connector, and said second leg portion extending transversely of the longitudinal connector axis and defining an open distal end of the boot from which the optical fiber cable extends, wherein the improvement comprises slot means in the boot extending from the open distal end thereof generally to at least the bend in the boot, the slot means being of a width to allow the optical fiber cable to be moved outwardly of the second leg portion to a position projecting from the first leg portion generally on the longitudinal connector axis, and complementary interengaging coupling means between the proximal end of the boot and the connector to provide for rotation of the boot about the longitudinal connector axis, whereby the cable can be moved out of the second leg portion through the slot means and the boot can be rotated to various angular orientations relative to the connector without twisting the cable.

2. In a right angle strain relief system as set forth in claim 1, wherein said bend in the boot forms generally forwardly and rearwardly facing sides of the boot running into the second leg portion, and the slot means is located in the rearwardly facing side of the boot.

3. In a right angle strain relief system as set forth in claim 1, wherein said boot is fabricated of flexible material and said slot means includes a mouth near the distal end of the boot, the mouth being narrower than the cable to provide a snap-fitting restriction for the cable to pass into and out of the cable-receiving passage.

4. In a right angle strain relief system as set forth in claim 3, wherein said bend in the boot forms generally forwardly and rearwardly facing sides of the boot running into the second leg portion, and the slot means and the mouth are located in the rearwardly facing side of the boot.

5. In a right angle strain relief system as set forth in claim 3, wherein the width of said slot means is approximately the same as the diameter of the cable.

6. In a right angle strain relief system as set forth in claim 1, wherein said slot means extends from the open distal end of the boot substantially through the bend in the boot.

7. In a right angle strain relief system as set forth in claim 6, wherein said bend in the boot forms generally forwardly and rearwardly facing sides of the boot running into the second leg portion, and the slot means is located in the rearwardly facing side of the boot.

8. In a right angle cable strain relief system, including a connector for terminating a distal end of a cable on a longitudinal connector axis, and a right angle strain relief boot extending from the connector, the boot having a cable-receiving passage therethrough, the boot having a first leg portion and a second leg portion joined at a bend, the first leg portion being on said longitudinal connector axis and defining a proximal end of the boot coupled to the connector, the second leg portion extending transversely of the longitudinal connector axis and defining an open distal end of the boot from which the cable extends, and complementary interengaging coupling means between the proximal end of the boot and the connector to provide for rotation of the boot about the longitudinal connector axis, wherein the improvement comprises slot means in the boot extending from the open distal end thereof generally to at least the bend in the boot, the slot means being of a width to allow the cable to be moved outwardly of the second leg portion to a position projecting from the first leg portion generally on the longitudinal connector axis, whereby the cable can be moved out of the second leg portion through the slot means and the boot can be rotated relative to the connector without twisting the cable.

9. In a right angle cable strain relief system as set forth in claim 8, wherein said boot is fabricated of flexible material and said slot means includes a mouth near the distal end of the boot, the mouth being narrower than the cable to provide a snap-fitting restriction for the cable to pass into and out of the cable-receiving passage.

10. In a right angle cable strain relief system as set forth in claim 9, wherein said bend in the boot forms generally forwardly and rearwardly facing sides of the boot running into the second leg portion, and the slot means and the mouth are located in the rearwardly facing side of the boot.

11. In a right angle cable strain relief system as set forth in claim 8, wherein the width of said slot means is approximately the same as the diameter of the cable.

12. In a right angle cable strain relief system as set forth in claim 8, wherein said slot means extends from the open distal end of the boot substantially through the bend in the boot.

* * * * *